United States Patent [19]
Nakamura et al.

[11] Patent Number: 5,596,615
[45] Date of Patent: Jan. 21, 1997

[54] FUEL ASSEMBLY FOR NUCLEAR REACTOR AND MANUFACTURING METHOD THEREOF

[75] Inventors: Kiyomi Nakamura; Masahisa Inagaki; Syouko Tanikoshi, all of Hitachi; Hideo Maki, Hitachinaka; Tsuneyuki Hashimoto, Hitachi, all of Japan

[73] Assignee: Hitachi, Ltd., Tokyo, Japan

[21] Appl. No.: 404,041

[22] Filed: Mar. 14, 1995

[30] Foreign Application Priority Data

Mar. 18, 1994 [JP] Japan .................................. 6-048266

[51] Int. Cl.$^6$ ........................................................ G21C 3/34
[52] U.S. Cl. ............................ 376/438; 376/457; 376/416; 376/420; 148/421; 148/672; 148/668; 148/516; 252/518; 252/635
[58] Field of Search ........................ 376/438, 457, 376/416, 420; 148/421, 672, 668, 516; 252/518, 635; 976/DIG. 273

[56] References Cited

U.S. PATENT DOCUMENTS

| | | | |
|---|---|---|---|
| 4,116,682 | 9/1978 | Polk et al. ........................ | 75/123.11 |
| 4,260,416 | 4/1981 | Kavesh et al. ..................... | 75/125 |
| 4,391,657 | 7/1983 | Feldmann et al. ................. | 148/133 |
| 4,570,695 | 2/1989 | Ishii et al. ....................... | 166/335 |
| 4,678,521 | 7/1987 | Yoshida et al. ................... | 148/11.5 F |
| 4,689,091 | 8/1987 | Yoshida et al. ................... | 148/11.5 F |
| 4,810,461 | 3/1989 | Inagaki ............................ | 376/457 |
| 4,863,679 | 9/1989 | Imahashi et al. .................. | 376/417 |
| 5,245,645 | 9/1993 | Steinberg ......................... | 376/457 |
| 5,296,058 | 3/1994 | Steinberg ......................... | 148/672 |
| 5,297,177 | 3/1994 | Inagaki et al. .................... | 376/462 |
| 5,310,431 | 5/1994 | Buck ............................... | 148/325 |
| 5,341,407 | 8/1994 | Rosenbaum et al. ............... | 376/409 |

*Primary Examiner*—Charles T. Jordan
*Assistant Examiner*—Meena Chelliah
*Attorney, Agent, or Firm*—Bardehle, Pagenberg, Dost, Altenburg, Frohwitter, Geissler & Partners

[57] ABSTRACT

A fuel assembly avoiding the generation of irradiation damage, a Zr alloy used for the same, and a manufacturing method thereof. According to one embodiment, a supersaturated solid-solution Zr alloy powder having a crystal grain size in the range of 1000 nm or less and containing Fe, Ni and Cr is prepared by mechanical alloying, and the alloy powder is subjected to HIP, hot-working, cold-working and final heat-treatment.

32 Claims, 12 Drawing Sheets

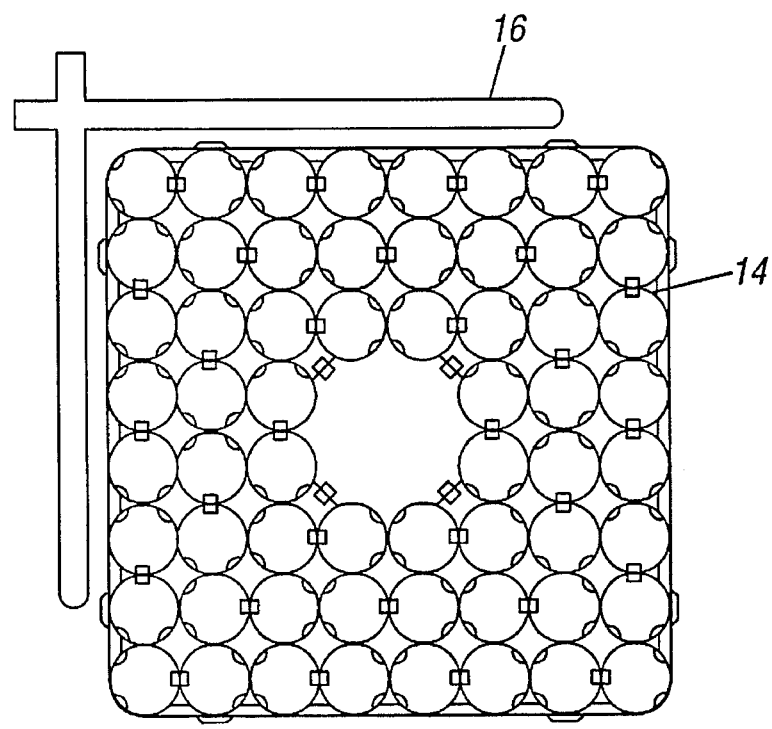
FIG. 10A
FIG. 10B
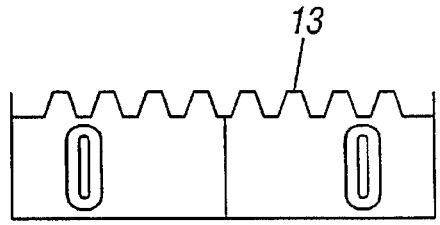
FIG. 11
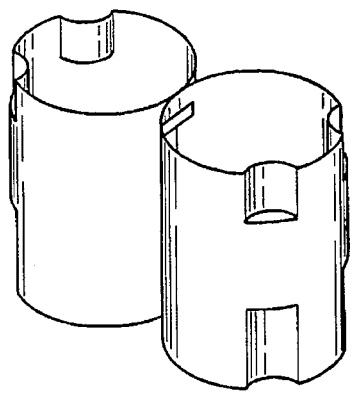

FUEL ASSEMBLY FOR NUCLEAR REACTOR AND MANUFACTURING METHOD THEREOF

BACKGROUND OF THE INVENTION

The present invention relates to a method of manufacturing a fuel assembly applicable for a core of a nuclear reactor using a fuel containing $Pu^{239}$, members constituting the fuel assembly (sometimes referred to herein as "fuel assembly elements"), and alloys used for the members. In particular, the present invention concerns a method of manufacturing a fuel assembly applicable for a reactor core in which a water-uranium fuel volume ratio is 1.5 or less and the conversion ratio from $U^{238}$ to $Pu^{239}$ is high, members constituting the fuel assembly, and alloys used for the members.

As for members constituting a fuel assembly used for nuclear power generation, those for a light water reactor use a zirconium alloy; and those for a fast breeder reactor use a stainless steel. A high conversion reactor acts as a bridge between a light water reactor and a fast breeder reactor, and has a feature of effectively converting non-fissionable $U^{238}$ contained in natural uranium to fissionable $Pu^{239}$ usable for power generation. The non-fissionable $U^{238}$, which has been not used in a light water reactor, can be used by the high conversion reactor, resulting in the effective utilization of uranium resource. The stored $Pu^{239}$ can be effectively used as a fuel for a fast breeder reactor, or a fuel for a high conversion reactor and a general breeder reactor.

In a conventional light water reactor and a high conversion reactor, the reduction in the exhaust amount of a spent fuel by increasing an operation cycle and the burn-up of fuel contributes to an economic merit, for example in reducing a power generation cost. However, when the operation cycle is increased and the burn-up of fuel is enhanced, the staying period of a fuel assembly in a reactor is increased. This further accelerates the corrosion of the surfaces of members constituting the fuel assembly in water at a high temperature/high pressure. Moreover, the effective conversion from $U^{238}$ to fissionable $Pu^{239}$ is mainly due to resonance neutrons having an energy higher than that of thermal neutrons. As a result, neutron spectrum in a reactor core is hardened (a large number of neutrons having high energy exist), thus accelerating the damage of the material due to neutrons.

A further problem is that the zirconium alloy (normally used as a high corrosion resisting alloy) has a tendency to become brittle by fast neutron irradiation.

Further, in the environment of a BWR (Boiling Water Reactor), a member constituting a ZIRCALOY fuel assembly generates a local oxidization called the nodular corrosion, and the corrosion portion propagates with time. A method of reducing this corrosion has been known, wherein a heat-treatment of heating a zirconium alloy for a short period of time in a temperature range of $(\alpha+\beta)$ phase or $\alpha$ phase and quenching the alloy is inserted in the downstream step in a member manufacturing process (for example, Unexamined Japanese Patent Publications Nos. SHO 51-110411 and SHO 51-110412, and Examined Japanese Patent Publications Nos. SHO 60-59983 and SHO 63-31543). This known technique is called $(\alpha+\beta)$ quenching or $\beta$ quenching, which is applied to alloys used for the existing light water reactor: ZIRCALOY-2 (Sn: 1.2–1.7 wt %, Fe: 0.10–1.20 wt %, Cr: 0.05–0.15 wt %, Ni: 0.03–0.08 wt %, O: 0.06–0.14 wt %, and the balance: Zr); and ZIRCALOY-4 (Sn: 1.2–1.7 wt %, Fe: 0.15–1.24 wt %, Cr: 0.05–0.15 wt %, O: 0.06–0.14 wt %, and the balance: Zr). Of the above alloy components, Fe, Cr and Ni are elements for improving corrosion resistance, and Sn is an element of improving strength. Fe, Cr, Ni precipitate as intermetallic compounds within crystal grains and crystal boundaries. These intermetallic compounds are refined by the $(\alpha+\beta)$ quenching or $\alpha$ quenching; and further when the cooling rate is sufficiently large, they are dissolved in solid even in the matrix. The mechanism of enhancing the corrosion resistance is not fully understood, but it is generally considered that the refining of precipitations and the increase in the concentration of solid-solution of Fe, Ni, and Cr contribute to the increase in the corrosion resistance.

The improvement of the alloy composition and alloy components leads to the enhancement of the corrosion resistance. Various improved alloys have been known as follows: an alloy improved in corrosion resistance which has the same composition of that of the existing ZIRCALOY but is optimized in the added amounts of the alloy elements (Unexamined Japanese Patent Publication No. SHO 62-228442); an alloy having the composition of ZIRCALOY which is further added with the fifth element such as Nb, Mo, W, V, Te, Ta, Si, Ru, Rh, Pd, Pt, or An (Unexamined Japanese Patent Publication Nos. SHO 60-36640, SHO 63-33535, SHO 64-73037, SHO 64-73038, and HEI 1-242747); an alloy having the composition of Zr—Nb alloy which is further added with elements of Sn, Mo, Cr, Ni, Fe, V, W, and Cu in a slight amount (Unexamined Japanese Patent Publication Nos. SHO 50-148213, SHO 51-134404, SHO 61-170552, SHO 62-207835, and HEI 1-119650); a Zr—Bi alloy (Unexamined Japanese Patent Publication No. SHO 63-290234); and a Zr—Sn—Te, Mo alloy (Unexamined Japanese Patent Publication No. SHO 63-290233). These zirconium alloys are intended to be used for a light water reactor, and thereby they are difficult to be used as they are for a high conversion type future reactor in which neutron spectrum is shifted on a high energy side as compared with the existing light water reactor.

As described above, in the high conversion type future reactor, non-fissionable $U^{238}$ is effectively convened into fissionable $Pu^{239}$ and is used for power generation. The nuclear transformation is generated by allowing resonance neutrons (energy: $10^0$ to $10^4$ eV) to absorb $U^{238}$. In such a reactor core, it is required to lower a water-uranium fuel ratio and to shift neutron spectrum on a high energy side (spectrum is hardened). As a result, the damage ratio of a member constituting a fuel assembly due to neutrons is increased. Accordingly, to significantly increase the burn-up of a light water reactor and to realize a high conversion type future reactor, it becomes important to improve the neutron damage resistance and the corrosion resistance of a member constituting a fuel assembly and to reduce the capture amount of neutrons of the member.

An object of the present invention, therefore, is to provide a Zr alloy for use with a fuel assembly element, which has a high neutron damage resistance and a high corrosion resistance, and further has a small resonance neutron capture cross-section. Another object of the present invention is to provide a method of manufacturing a member such as a fuel sheath tube constituting a fuel assembly usable for a high conversion type future reactor which is capable of keeping an excellent performance for a long period of time.

SUMMARY OF THE INVENTION

For improving a neutron damage resistance, reduction in crystal gains has been found to be very effective. This is because a pair of an interstitial atom and a vacancy produced by neutron irradiation rapidly disappear at crystal grain boundaries, thus preventing the generation of irradiation defect in the crystal grains. Even if the irradiation defect is generated, the density thereof is significantly lowered.

According to one embodiment of the invention, therefore, crystal grain size of 1000 nm or less gives the most reduction in irradiation defect. According to a further embodiment of the invention, significant reductions in the radiation defect occur with crystal grain sizes below 100 nm, as explained with regard to other embodiments, below.

According to one more specific embodiment of the invention, there is provided a fuel assembly for a nuclear reactor comprising fuel assembly elements, said fuel assembly elements comprising: a fuel pellet made of uranium containing plutonium; a fuel sheath tube for sheathing said pellet; a spacer for holding said fuel sheath tube; and a channel box for containing a plurality of said sheath tubes, wherein at least one fuel assembly element comprises a Zr-containing metal, and an average crystal grain size of said Zr-containing metal is in the range of 1000 nm or less.

According to further embodiments, said average crystal grain size is in the range of 100 nm or less; at least one of said fuel assembly elements comprises a Zr alloy having a random crystal orientation; and at least one fuel assembly element comprises a Zr alloy which comprises at least about 0.02 wt % of Fe. In some embodiments, at least one fuel assembly element comprises a Zr alloy comprising at least about 0.05 to 30 wt % of Fe, and an average crystal grain size of said Zr alloy is in the range of 100 nm or less. According to still further embodiments, at least one fuel assembly element comprises a $ZrFe_2$ intermetallic compound containing at least about 33 atomic percent Zr. According to another embodiment, at least one fuel assembly element comprises a $ZrFe_2$ intermetallic compound containing at least about 66 atomic percent Fe.

Alternatively, there are embodiments in which at least one fuel assembly element comprises a $Zr(Fe, Ni, Cr, Sn)_2$ intermetallic compound containing a range of Zr between about 30 and about 35 atomic percent, and in other embodiments, at least one fuel assembly element comprises a $Zr(Fe, Ni, Cr, Sn)_2$ intermetallic compound containing a range of (Fe, Ni, Cr, Sn) of between about 65 and about 70 atomic percent.

According to still another embodiment, there is provided a fuel assembly element for a nuclear reactor comprising a Zr-containing metal having an average crystal grain size of 1000 nm or less.

Still further, in one embodiment of the invention, there is provided a fuel assembly element manufacturing method of a Zr alloy or compound, said fuel assembly element being chosen from a group consisting of: a fuel sheath tube for sheathing a fuel pellet made of uranium containing plutonium, a spacer for holding said sheath tube, or a channel box for containing a plurality of said sheath tubes, which constitute a fuel assembly used for a core of a nuclear reactor, said method comprising: mechanically mixing a Zr-containing metal and an alloying element, the alloying element being chosen from a group consisting of: Fe, Cr, Ni, Nb, Mo, Te, Bi, and Sn, whereby a Zr alloy is produced; crystallizing the pressure-treated Zr alloy in a temperature range of between the crystallization temperature of the pressure-treated Zr alloy and a maximum crystallization temperature, said maximum crystallization temperature being 200 degrees C. above the crystallization temperature of the pressure-treated Zr alloy; subjecting the Zr alloy to an isostatic pressure, whereby a pressure-treated Zr alloy is produced; and forming the pressure-treated alloy into a shape of the fuel assembly element. Further, in some embodiments, said crystallizing occurs during said subjecting, wherein said subjecting comprises subjecting the Zr alloy to an isostatic pressure at a temperature lower than a crystallization temperature of the Zr alloy, and in other embodiments, said crystallizing comprises working the pressure-treated Zr alloy at a temperature range between about 100 degrees C. and about 200 degrees C.

According to still further embodiments, said subjecting occurs at a temperature above the crystallizing temperature for said Zr alloy, while according to other embodiments, said mechanically mixing comprises: hydrogenation of the Zr-containing metal; crushing of the Zr-containing metal into a powder, and; dehydrogenation of the powder. According to even further embodiments, said dehydrogenation comprises heating in a vacuum atmosphere.

According two to alternate embodiments of the method, said Zr-containing metal comprises a powder of pure Zr or a Zr alloy.

According to still a further embodiment of the method, the temperature is never allowed above about 650 degrees C., and in another embodiment, there is further provided hot-working, performed below about 650 degrees C.

According to some embodiments of the invention, annealing is performed at a temperature higher than about 530 degrees C.

According to still a further embodiment, for improving the corrosion resistance, it is effective to dissolve in solid a corrosion resistance improving element such as Fe, Ni, or Cr in a matrix. The super-saturated solid-solution with ultra-fine crystals can be obtained by a means of realizing a non-equilibrium crystal structure, for example, mechanical alloying, molten metal quenching, or splat cooling.

The neutron capture cross-section of Fe is about ⅓ that of Zr in an energy range (of resonance neutron) of $10^0$ to $10^4$ eV. The reduction in the capture mount of resonance neutrons of a member constituting a fuel assembly is achieved by the methods of: (a) reducing the resonance neutron capture cross-section by increasing the added amount of Fe, and (b) thinning the member by increasing the strength of the Zr alloy. By increasing the added mount of Fe in a zirconium alloy, the above-described precipitations are coarsened, thereby leading to the embrittlement of the material. In particular, the precipitations produced upon melting are significantly coarsened, so that the zirconium alloy cannot be manufactured by a conventional manufacturing process. Accordingly, even in this case, the above-described means of realizing a non-equilibrium crystal structure is effective.

According to even further embodiments of the present invention, there is provided a fuel assembly for a nuclear reactor comprising: a fuel pellet made of uranium containing plutonium; a fuel sheath tube for sheathing the pellet; a spacer for holding the fuel sheath tube; and a channel box for containing a plurality of the sheath tubes, wherein at least one member of the fuel sheath tube, the spacer and the channel box is made of a Zr alloy containing 0.05 to 30 wt % of Fe, and an average crystal grain size of the Zr alloy is in the range of 1000 nm or less.

In the above fuel assembly, at least one member of the fuel sheath tube, the spacer and the channel box may be made of a Zr alloy, and an average crystal grain size of the Zr alloy may be in the range of 1000 nm or less. Also in the above fuel assembly, at least one member of the fuel sheath tube, the spacer and the channel box may be made of a Zr alloy containing an alloy element forcibly dissolved in solid in an amount of 2 wt % or more. Further in the above fuel assembly, at least one member of the fuel sheath tube, the spacer and the channel box may be made of a Zr alloy containing 0.5–30 wt % of Fe, 0–5 wt % of Ni, 0–5 wt % of Cr, 0–5 wt % of Nb, 0–1 wt % of Mo, 0–1 wt % of Te, 0–5 wt % of Sn, 0–2 wt % of Bi, 0–1 wt % of O, and 0–0.5 wt % of Si.

According to still a further embodiment of the present invention, there is provided a Zr alloy containing 0.5–30 wt % of Fe, 0–5 wt % of Ni, 0–5 wt % of Cr, 0–5 wt % of Nb, 0–1 wt % of Mo, 0–1 wt % of Te, 0–5 wt % of Sn, 0–2 wt % of Bi, and 0–0.5 wt % of Si. And, according to one aspect of such an embodiment, there is provided a Zr alloy containing an alloy element forcibly dissolved in an mount of 2 wt % or more.

According to an even further embodiment of the present invention, there is provided a Zr alloy powder made of an amorphous Zr alloy containing crystal grains having a crystal grain size of 1000 nm or less In still a further embodiment, there is provided a Zr alloy powder made of a Zr alloy containing 0.5–30 wt % of Fe, 0–5 wt % of Ni, 0–5 wt % of Cr, 0–5 wt % of Nb, 0–1 wt % of Mo, 0–1 wt % of Te, 0–5 wt % of Sn, 0–2 wt % of Bi, and 0–0.5 wt % of Si, and the Zr alloy powder made of a Zr alloy containing an alloy element forcibly dissolved in solid in an amount of 2 wt % or more.

Moreover, according yet another embodiment of the present invention, there is provided a fuel assembly manufacturing method of manufacturing either of a fuel sheath tube for sheathing a fuel pellet made of uranium containing plutonium, a spacer for holding the sheath tube, and a channel box for containing a plurality of the sheath tubes, which constitute a fuel assembly used for a core of a nuclear reactor, the method comprising: a) a process of mechanically mixing pure metal powders including Zr powder or a crystalline Zr alloy powder for alloying, thereby manufacturing an amorphous alloy powder made of a Zr alloy being mostly amorphous; b) a process of solidifying the amorphous alloy powder under an isostatic pressure at a temperature lower than a re-crystallization temperature of the amorphous alloy powder; c) a process of forming the solidified block into the shape of either of the member by hot-working or cold-working; and d) a process of crystallizing the metal structure of the formed product by heat-treatment. In the above-described process of manufacturing a pure Zr powder or a crystalline Zr alloy powder, preferably, sponge-like pure Zr or an ingot of a Zr alloy is hydrogenated and crushed into a powder having a specified particle size, and the powder is dehydrogenated by heating in a vacuum atmosphere. In the above-described process of forming the solidified block into a specified shape by hot-working or cold-working, preferably, the hot-working is performed at 650 degrees C., followed by cold-working. In the above-described process of crystallizing the metal structure by heat-treatment, preferably, the final crystallization annealing is performed at a temperature higher than 530 degrees C.

DESCRIPTION OF THE DRAWINGS

For a more complete understanding of the present invention and for further advantages thereof, reference is made to the following Detailed Description taken in conjunction with the accompanying drawings, in which:

FIGS. 10a and 10b show a plan view of a spacer and a control rod.

FIG. 11 is a perspective view showing cells in a spacer.

EXPLANATION OF SYMBOLS

Figure 1:
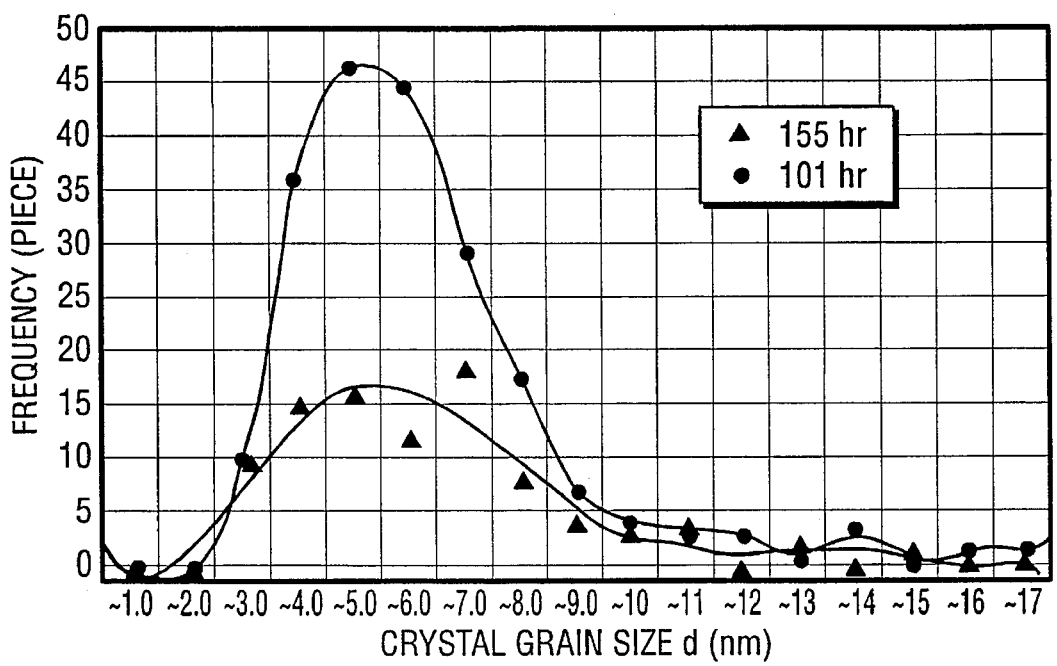
FIG. 1 is a diagram showing the relationship between the crystal grain size and the frequency.

1: sheath tube,
2: liner,
3: end plug,
4: nuclear fuel pellet,
5: plenum spring,
6: welding portion,
7: lower end portion
10: fuel assembly,
11: channel box,
12: hanging handle,
13: spacer,
14: cell,
15: upper end plate,
16: control rod,
17: steam separator,
18: upper grating plate,
19: reactor core supporting plate,
20: corner,
21: side,
22: control rod guide tube,
25: follower,
26: sheath,
27: $B_4C$ tube,
28: small diameter portion,
29: large diameter portion,
30: end plug, 31: fuel rod, 36: lower end tie plate.

It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS OF THE INVENTION

One specific feature of an embodiment of the present invention lies in that each of a fuel sheath tube (1), a spacer (13) and channel box (11) constituting a fuel assembly (10) for a nuclear reactor is formed of a Zr alloy; the Zr alloy is refined into an ultra-fine crystal particle size; and the Zr alloy contains alloy elements of Sn, Fe, Ni and Cr mostly dissolved in solid in amounts larger than those in a conventional alloy. In particular, by refining the Zr alloy into an ultra-fine crystal grain size of 100 nm or less, the irradiation damage can be substantially perfectly prevented. Additionally, each of the above-described alloy elements is added to enhance the strength and corrosion resistance.

The crystal grain size of a Zr alloy of the present invention is in the range of 1000 nm or less, preferably, in the range of 300 nm or less, particularly, in the range from 10 to 100 nm.

Sn is added in an amount of 15 wt % or less. It may be added in an amount of 1 to 2 wt % like a conventional Zr alloy; however, the added amount larger than 1 to 2 wt % gives a large effect, and is preferably in the range of from 3 to 7 wt %.

Fe is added in an amount of 0.05 to 30 wt %. It may be added in an amount of 0.1 to 0.5% like a conventional Zr alloy. In a conventional Zr alloy, precipitations of Fe are formed by the repeating of cold-working and annealing, resulting in the reduced corrosion resistance. On the contrary, in the Zr alloy of the present invention, precipitations of Fe are difficult to be formed and are dissolved in solid, thus increasing the corrosion resistance. In particular, to obtain a high effect, the content of Fe is in range of 0.5% or more, preferably, in the range of from 1 to 5%.

Ni is added in an amount of 5 wt % or less. Ni has a high hydrogen absorption property. However, since the Zr alloy of the present invention has an ultra-fine crystal grain size, Ni can be added in an amount of from 0.2% or more. Additionally, at least one kind of Cr, Nb, Mo, Te, Bi and Si may be added in an mount of 5 wt % or less for increasing the strength. In particular, there may be added at least one kind of 0.05–3% of Cr, 0.2–2.5% of Nb, 0.2–1% of Mo, 0.1–1% of Te, 1–2% of Bi and 0.1–0.5% of Si. Oxygen (O) is added in the alloying of the present invention. The addition of oxygen is effective to suppress the crystal grain growth due to the heating at a high temperature, which leads to the generation of ultra-fine crystal grains.

The example of the Zr alloy composition (wt %) of an embodiment of the present invention is as follows: (1) A Zr alloy containing 1–5% of Sn and one kind of 0.1–30% of Fe, 0.01–5% of Ni and 0.1–5% of Te. (2) A Ze alloy containing the alloy elements shown in (1) and further 0.1–5% of Cr. (3) A Zr alloy containing 0.5–5% of Nb. (4) A Zr alloy containing the alloy element shown in (3) and further 0.1–5% of Bi. (5) A Zr alloy containing the alloy element shown in (3), and further 0.1–5% of Sn and one kind of 0.2–5% of Mo, 0.1–5% of Fe, 0.01–5% of Ni, and 0.1–5% of Te.

In the usual process of melting, working and heat-treatment, the addition of a transient metal element such as Fe forms a large mount of a coarsened intermetallic compound in the Zr matrix. The Zr alloy having such a metal structure is brittle and is extremely difficult to be worked. However, by refining the Zr alloy having the composition containing such a brittle intermetallic compound in the usual state, the Zr alloy can ensure a high ductility. The feature of the present invention lies in manufacturing a structural member having an ultra-fine crystal state by working and heat-treatment by use of a material in an ultra-fine crystal state in which such an alloy element is dissolved in solid in Zr.

A pure Zr powder and alloy powders (or a Zr alloy powder) are mechanically mixed and crushed, to form an alloy powder in a non-equilibrium state (super-saturated solid-solution). At this time, the pure metal powder may be replaced by a metal powder containing oxygen of 1,000 to 10,000 ppm. Moreover, an oxide powder such as $ZrO_2$ may be added and mixed. The addition of the oxide powder is effective to enhance the crystallization temperature at the time of the subsequent HIP (hot isostatic pressing) for preventing the coarsening of crystal grains during HIP, hot-working and final annealing.

The alloy powder thus obtained is sintered by HIP, to form a bulk material of a Zr alloy. The sintering may be performed at a temperature (<800 degrees C.) lower than a re-crystallization temperature for keeping at least part of the alloy powder in a non-equilibrium state after HIP and for preventing the coarsening of an intermetallic compound. In the case where the alloy powder is constituted of an amorphous alloy, the sintering may be performed at a temperature lower than the temperature higher than a crystallization temperature of the alloy by about 100 degrees C. for preventing the coarsening of crystals and the coarsening of the precipitated intermetallic compound. The solution treatment after HIP is not required and it may be omitted.

The hot-plastic working may be performed at a temperature lower than a re-crystallization temperature, 650 degrees C. The cold-plastic working is performed at a draft of 80% or less, and the final annealing is performed at a temperature lower than 800 degrees C.

Of the alloy elements, Sn and O are elements for increasing the strength; Fe is an element for reducing the resonance neutron capture cross-section; and Fe, Cr and Ni are elements for increasing the corrosion resistance.

EXAMPLE 1

An alloy powder (Alloy No. 1) and raw powders of Zr, Fe, Sn Cr and Ni (Nos. 2 and 3), having a particle size of 100 µm or less and having a composition shown in Table 1 (wt %), were subjected to metal alloying (MA) in a planetary bah mill for 101 hr and 155 hr respectively under an argon atmosphere at room temperature. The composition of each alloy powder after alloying was shown as an MA alloy powder in Table 1. In the ball mill, the vessel and balls are made of AISI 304 steel. Each of the alloy powder No. 1 and the Zr powder contains oxygen of about 900 ppm.

TABLE 1

| alloy | raw powder | | | | |
|---|---|---|---|---|---|
| | Sn | Fe | Cr | Ni | Zr |
| No. 1 | 1.5 | 0.25 | 0.14 | 0.10 | bal. |
| No. 2 | 1.3 | 0.05 | 0.05 | 0.03 | bal. |

TABLE 1-continued

| No. 3 | 10.0 | 30.0 | — | — | bal. |

| | MA alloy powder | | | | |
| alloy | Sn | Fe | Cr | Ni | Zr |
| --- | --- | --- | --- | --- | --- |
| No. 1 | 1.6 | 0.50 | 0.50 | 0.20 | bal. |
| No. 2 | 1.5 | 0.15 | 0.10 | 0.10 | bal. |
| No. 3 | 13.0 | 55.0 | — | — | bal. |

The alloy powder after mechanical alloying (MA) contained oxygen in an amount of about 4,000 ppm. The reason why the contents of Sn, Fe, Cr and Ni in the MA alloy powder are higher than those in the raw powder lies in that Zr is stuck on the wall of the vessel of the planetary ball mill, and in that the alloy elements are supplied from the vessel and balls. The MA alloy powder No. 1 was observed for the fine structure using a transmission electron microscope, which gave the result that the matrix of the MA alloy powder is made of amorphous crystal surrounding ultra-fine crystals having a crystal grain size of 10 nm or less, and that any dislocation does not exist in the crystal grains although the alloy powder is applied with a forcible work at room temperature. Moreover, although in the conventional Zr alloy, there exist intermetallic compounds such as Zr(Fe, Ni)$_2$, Zr$_2$(Fe, Ni), Zr(Fe, Cr)$_2$, these precipitation phases do not exist in the inventive alloy powder. This shows that the alloy elements are dissolved in the matrix as the super-saturated solid-solution.

FIG. 1 is a graph showing the result of measuring the distribution of the crystal particle size of the MA alloy powder. As described above, the crystal structure was contained in the alloy powder only in an amount of about 5 vol %, and 90% or more of the crystal grain sizes were in the range of 2 to 10 nm. By increasing a period of time for mechanical alloying (MA) from 101 hr to 155 hr, the crystallized portion in the alloy powder is reduced, and the whole alloy powder becomes amorphous by the MA for about 200 hr. In the present invention, it is desirable that the whole MA alloy powder becomes substantially amorphous.

Figure 2:
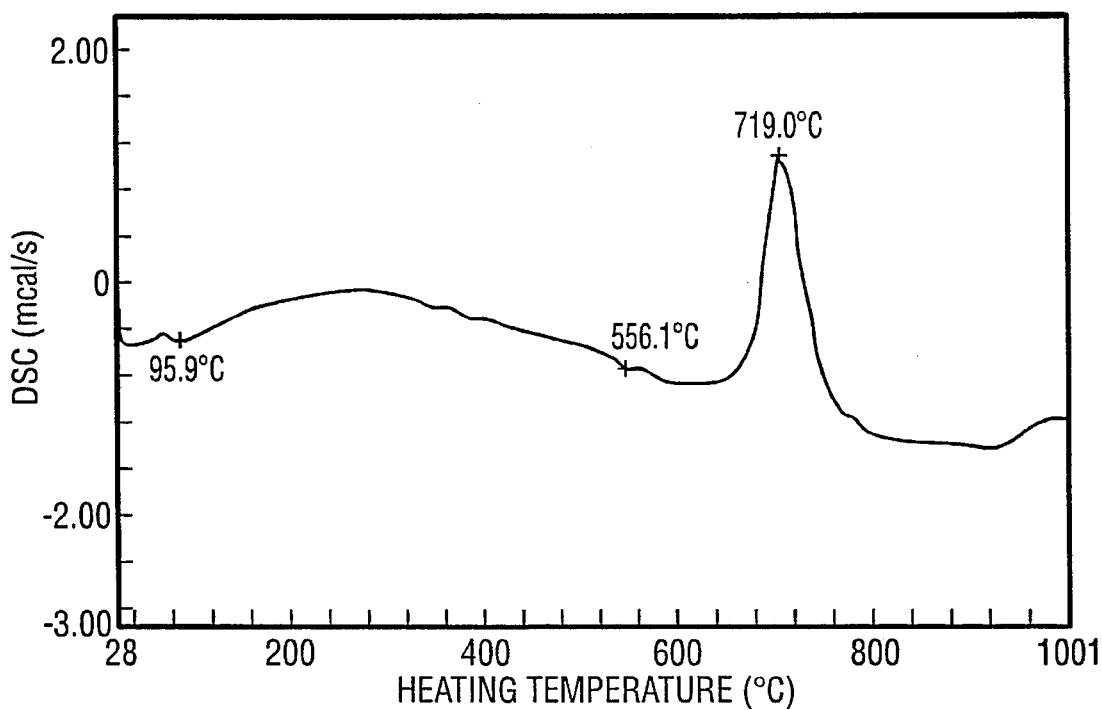
FIG. 2 is a diagram showing the relationship between the heating temperature and DSC.

FIG. 2 is a diagram showing the result in which the alloy powder No. 1 is subjected to scanning differential thermal analysis and the re-crystallization temperature is measured. The peak of the heat-generation appears at 719 degrees C., which shows a possibility that the holding of the alloy powder for a long period of time at the temperature higher than 719 degrees C. causes the re-crystallization of the above-described amorphous structure, leading to the growth of crystal grains. However, even when the MA alloy powder No. 1 was heated for 5 hr at 800 degrees C., it kept the ultra-fine structure yet while the crystal grains were slightly grown into a size of about 50 nm. Accordingly, it is revealed that the alloy powder No. 1 can keep the ultra-fine structure even by setting the powder processing (solidifying) temperature after MA at a temperature near 800 degrees C.

When being actually heated at 800 degrees C., the alloy powder No. 1 was present substantially as a super-saturated solid-solution without any precipitation phase.

Figure 3:
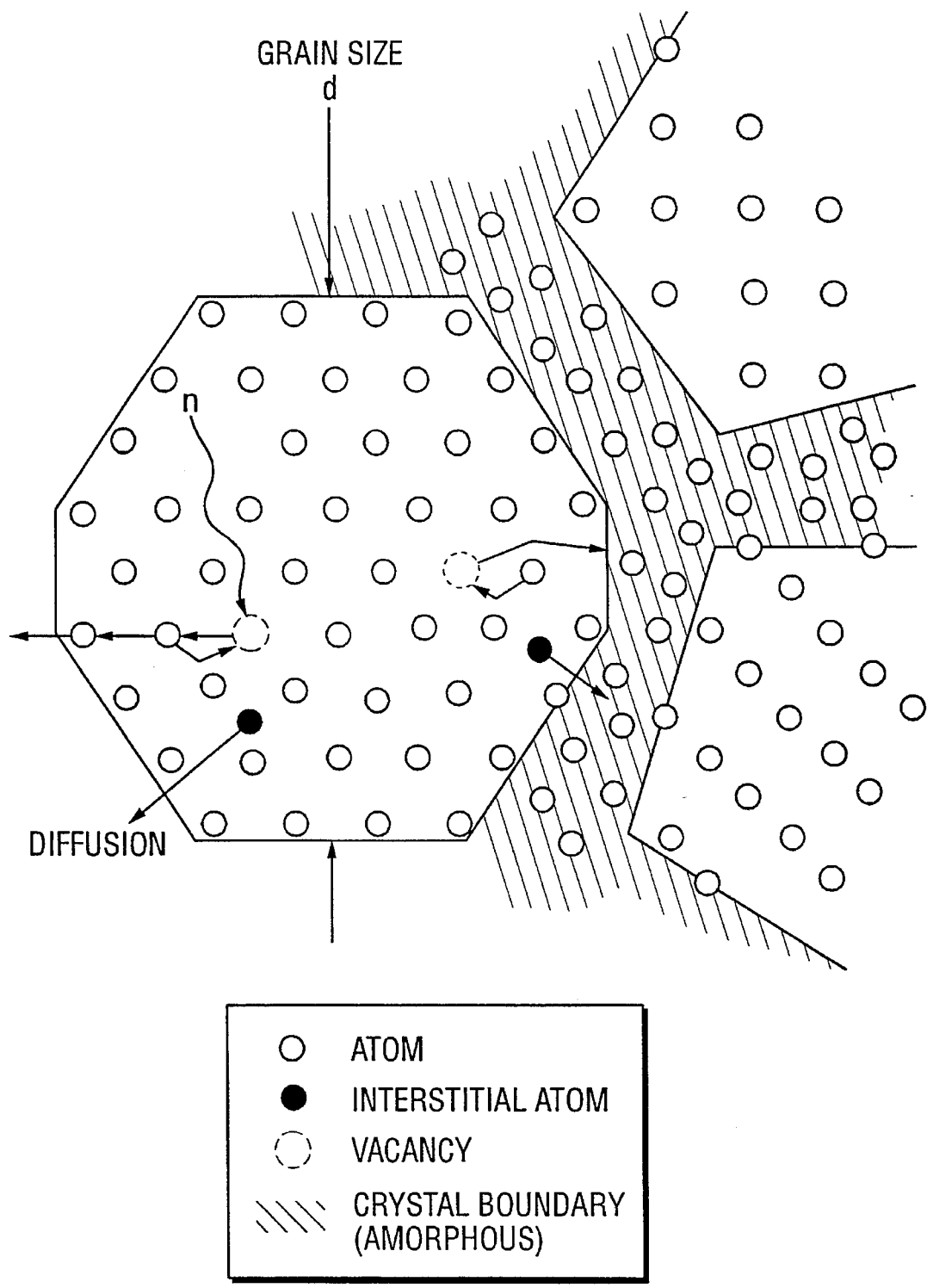
FIG. 3 is a view showing the mechanism of preventing the damage by neutron irradiation.

FIG. 3 shows a damage preventive mechanism for ultra-fine crystals against neutron irradiation. As shown in the figure, atoms are repelled by neutrons and a pair of an interstitial atom and a vacancy are formed. In the usual crystal, the interstitial atoms are bonded to each other to form a loop of a dislocation, which causes the irradiation embrittlement, irradiation growth and the like. However, in the ultra-fine crystal alloy, interstitial atoms and vacancies are present near the crystal boundaries, and accordingly they move and disappear. Consequently, in the ultra-fine crystals in which the grain boundaries are present near interstitial atoms and vacancies, any defect is not generated in the crystal grains, thus preventing the generation of damages such as irradiation embrittlement, irradiation growth and the like. The relationship between the crystal grain size and the irradiation condition for preventing the irradiation damage is represented by the equation (1).

$$d = 2 \cdot K_0^{-1/4} \cdot \exp^{(-Em/4 \, kT)} \quad (1)$$

where d: crystal grain size (nm), $K_o$: neutron irradiation rate (dpa/s), k: Boltsmann's constant, T: temperature (K), and Em: moving energy (eV) of interstitial atom.

Figure 4:
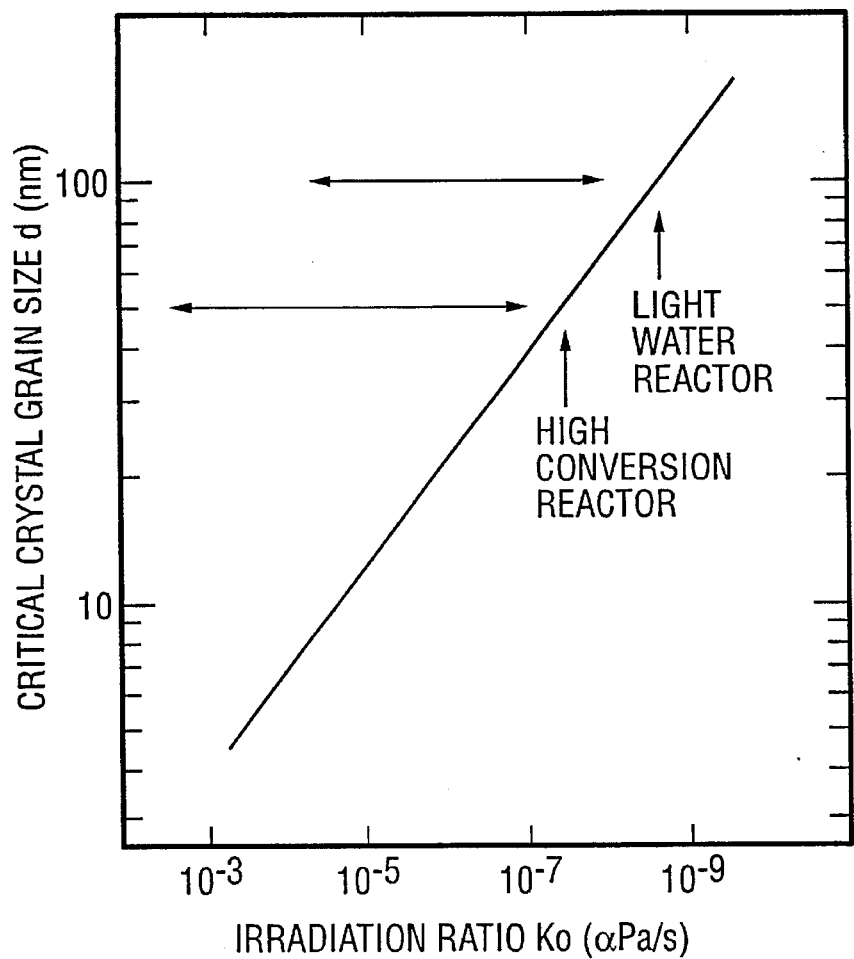
FIG. 4 is a typical view showing the relationship between the neutron irradiation rate and the critical crystal grain size.

FIG. 4 shows the relationship between the neutron irradiation rate and the critical crystal grain size for preventing the irradiation damage. From the figure, it becomes apparent that in a light water reactor, the irradiation damage can be prevented by setting the crystal grain size to be in the rage of 100 nm or less. Moreover, in a high conversion reactor, the same effect can be obtained by setting the crystal grain size to be in the range of 50 nm or less. In the existing nuclear reactor, the neutron irradiation rate is $5 \times 10^{-8}$ (dpa/s) and the quantity of irradiation is 7 dpa; and in a high conversion reactor, the former is $3 \times 10^{-7}$ dpa/s and the latter is 20 dpa.

Figure 5A:
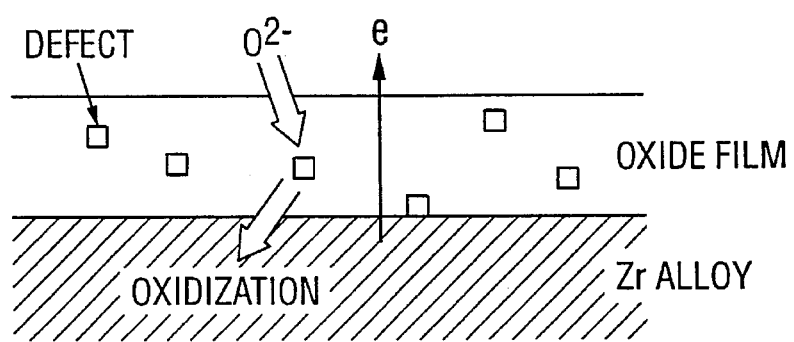
FIGS. 5a and 5b show the effect of Fe and Ni exerted on the corrosion resistance of a Zr alloy.
Figure 5B:
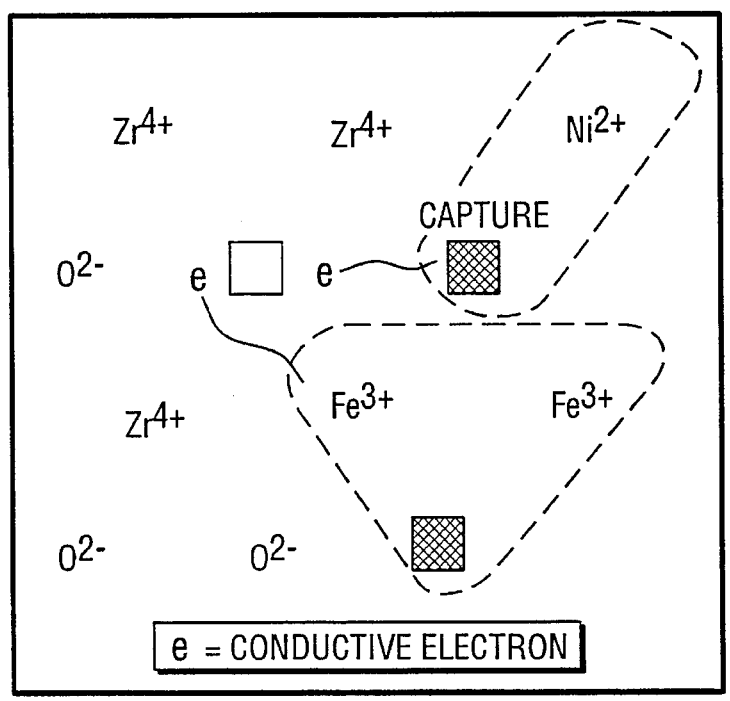
Figure 17:
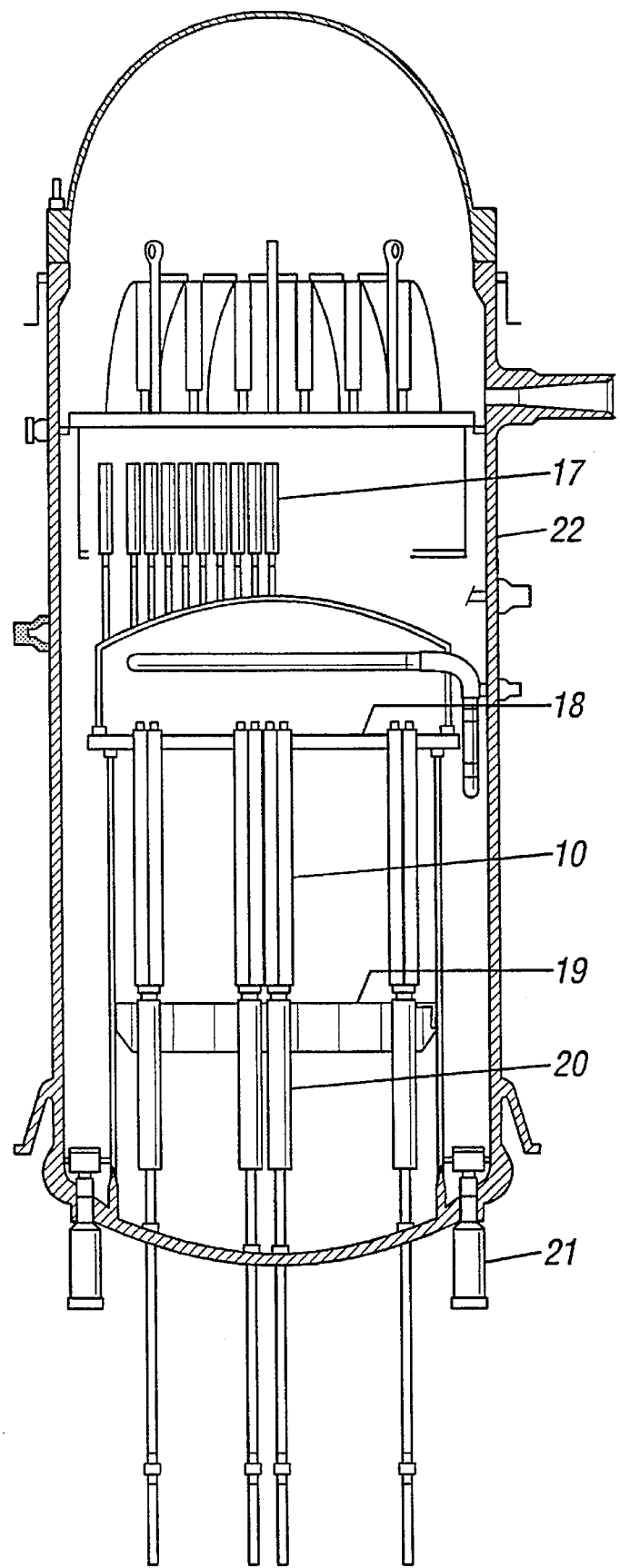
FIG. 17 is a sectional view showing the structure of the core of a high conversion reactor.

FIGS. 5a and 5b show the result of the effect of Fe, Ni and Cr exerted on the corrosion resistance. Each of these elements exists at the position of Zr by the replacement with Zr in the oxide film. As the electronic conductivity of the oxide film becomes higher, the corrosion rapidly proceeds. Fe, Ni, and Cr act to trap these conductive electrons thereby lowering the electronic conductivity of the oxide film, resulting in the improved corrosion resistance. The probability of replacement of Zr by Fe, Ni, and Cr is significantly increased in a super-saturated solid-solution. Accordingly, in terms of corrosion resistance, the member of a fuel assembly (10), as shown in FIG. 17, of the present invention is extremely excellent. However, Nb having five valence electrons, and Mo and Te having six valence electrons increase the electronic conductivity, so that it seems to lower the corrosion resistance. The movement of electrons in the oxide film rate-determines the corrosion of Zr.

Figure 6:
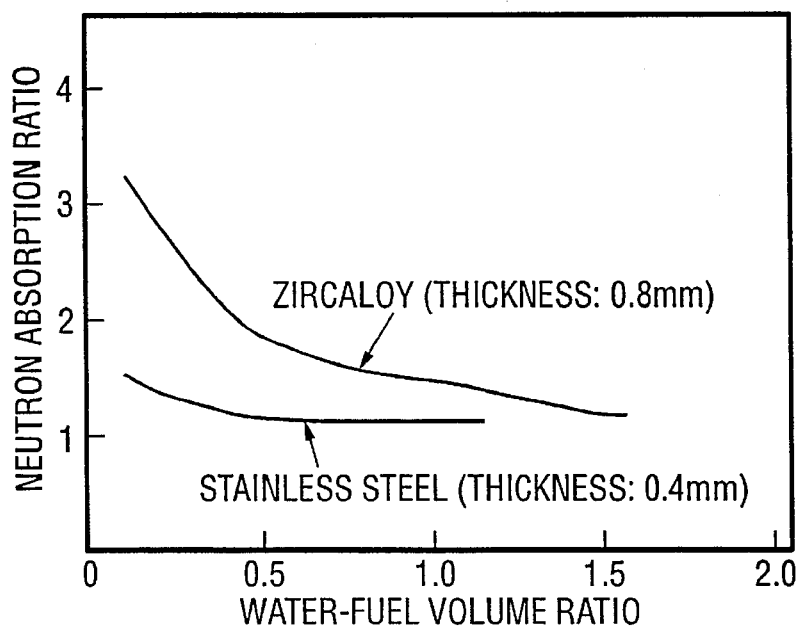
FIG. 6 is a diagram showing the relationship between the water-fuel volume ratio and the neutron absorption ratio.

FIG. 6 shows the relationship of a water-fuel volume ratio exerting an effect on the neutron absorption rate (%) represented by the resonance neutron capture cross-section based on the whole neutron generation rate. In the figure, the line shows the state that the resonance neutron capture cross-section of the Zr alloy is reduced by the change in the alloy composition and the strength. As is apparent from the figure, even when the water-fuel volume ratio is about 0.5 or less, by increasing the strength of the Zr alloy by two times and thus setting the thickness to be half, the resonance neutron absorption rate can be reduced to the value similar to that of stainless steel. Alternately, by adding Fe in an amount of 50 wt % or more, the resonance neutron capture cross-section is reduced, thus realizing the member of a fuel assembly (10) which has the same characteristics as those of stainless steel. In a high conversion reactor, the water-fuel volume ratio is set to be in the range of 1.5 or less.

The ultra-fine crystal powder was subjected to electron irradiation for examining the irradiation resistance. Electron beams of imparting damages equivalent to those obtained by imparting the quality of neutron irradiation of 10 dpa were irradiated, and the fine structure was examined. The irradiation temperature was set at 280 degrees C. which was equivalent to the water temperature in a nuclear reactor. As a result, the ultra-fine crystal powder showed the very excellent irradiation resistance without any irradiation defect.

The same experiments were performed for Nos. 2 and 3 alloy powders, which gave the same results as those of the alloy powder No. 1. Consequently, it is revealed that the ultra-refining of the crystal grains using the mechanical alloying (MA) method can provide a very excellent irradiation resistance.

EXAMPLE 2

A fuel structural member was manufactured using the alloy powder No. 1 subjected to mechanical alloying for 155 hr in the manner described in Example 1. The MA alloy powder was formed and sintered in a cylindrical shape by a hot-isostatic pressing (HIP) at about 800 degrees C. The density was about 98% of the theoretical density. The sintered cylindrical body was perforated at the center, to form a hollow billet. A pure Zr tube was then inserted in the hollow billet and the end surfaces thereof were welded, thus integrating the alloy hollow billet and the pure Zr tube. The integrated tube was subjected to hot-extrusion at 650 degrees C., to form a raw tube. The density of the raw tube almost equals the theoretical density. The raw tube was repeatedly and alternately subjected to cold-rolling by a pilger mill and annealing by three times. The draft was set at 70%, and the final annealing temperature was set at 600 degrees C., thus obtaining a finished fuel sheath tube having an outside diameter of 12.3 mm and a wall thickness of 0.86 mm. In the sheath tube thus obtained, an average crystal grain size was smaller than 100 nm, and any precipitation was not recognized and all of the alloy elements are substantially dissolved in solid in the matrix. The pure Zr liner layer may be set at a desirable thickness in the range of from 10 to 100 μm. The above-described billet may be set to have an outside diameter of 60 to 70 mm and a thickness of 10 to 12 mm.

The pure Zr liner layer of the sheath-tube was removed by mechanical grinding. The resultant sheath tube was kept for 50 hr in steam of 10.3 MPa at 500 degrees C. for examining the corrosion resistance. As a result, the increment by the corrosion was 40 mg/dm$^2$ or less, which showed the very good corrosion resistance. A conventional fuel sheath tube was also subjected to the corrosion test under the same condition, which gave the result of the increment of about 50 mg/dm$^2$.

Figure 7:
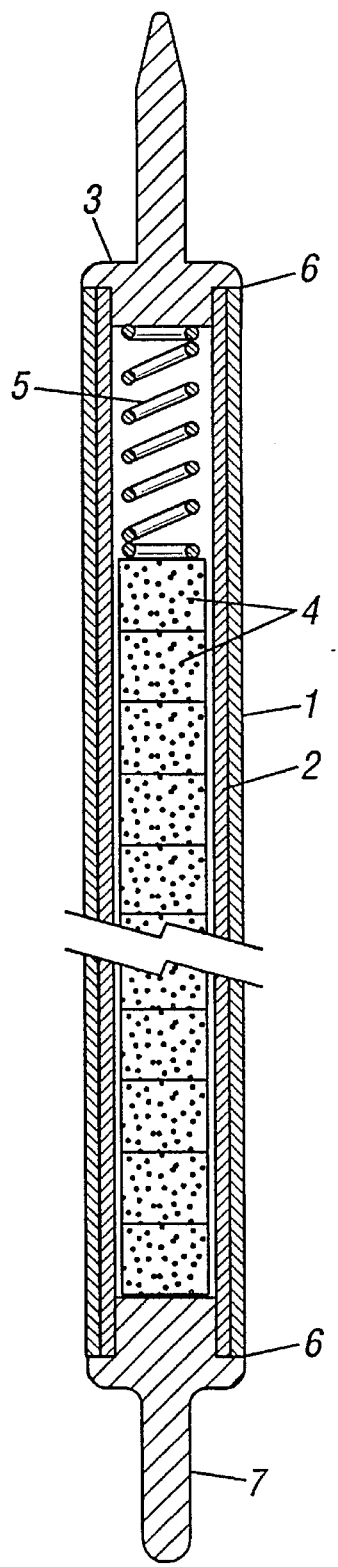
FIG. 7 is a sectional view of a fuel rod.

A fuel rod, shown in FIG. 7 was manufactured using the above sheath tube (1) welded with end plugs made of the same alloy. The fuel rod includes an MA alloy sheath tube (1), a pure Zr liner (2), an upper end plug (3), a nuclear fuel pellet (4), a plenum spring (5), a welding portion (6), and a lower end portion (7). The welding was performed by a TIG welding method. The pure Zr liner (2) had a wall thickness of about 100 μm.

In this example, since the sheath robe (1) is thinned by repeating cold-working and annealing, the orientation of the crystal face of (0002) of Zr having the hexagonal crystal structure tends to be directed at right angles to the planar surface; however, the orientation is difficult to be generated because of the ultra-fine crystal grains. As a result, it seems that the crystal grains are distributed at random to the extent of a Fr value of about 0.25 to 0.35.

EXAMPLE 3

Figure 8A:
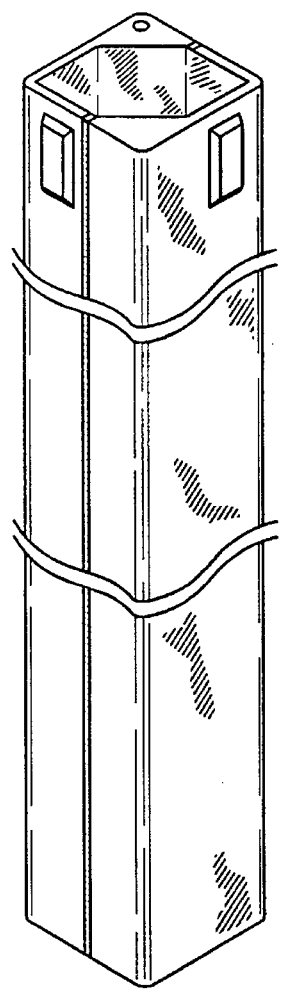
FIGS. 8a and 8b show a perspective view of a channel box.
Figure 8B:
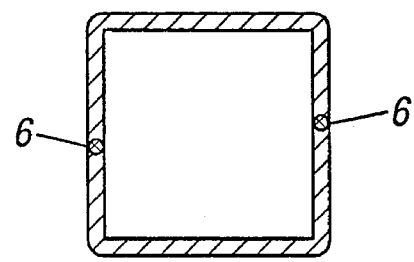
Figure 9A:
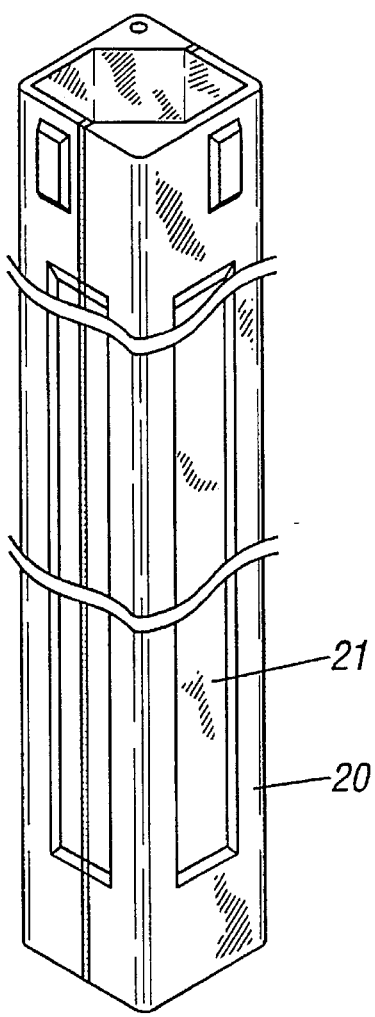
FIGS. 9a–c show a perspective view of a channel box.
Figure 9B:
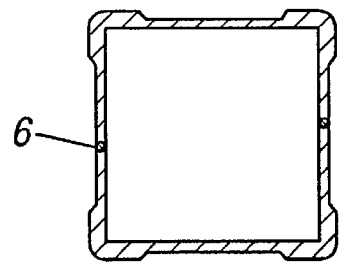
Figure 9C:
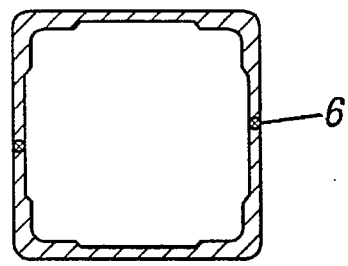

The alloy powder No. 1 (MA: 155 hr) in Example 1 was formed and sintered by HIP, to manufacture a slab. The slab was hot-rolled, to enhance the density of the material substantially up to the theoretical value. The hot-rolled sheet was repeatedly and alternately subjected to cold-working at a draft of about 30% and vacuum annealing at 600 degrees C., to form a sheet having a thickness of 2 mm. The resultant sheet was bent in a U-shape. Two of these sheets were welded to each other, to form an angular cylinder. The angular cylinder was shaped in specified dimensions, to form a channel box. In the alloy of this example, any precipitation was not recognized, and alloy elements were dissolved in solid. FIGS. 8a–b and 9a–c are perspective views, wherein FIGS. 8a–b shows a straight structure having a constant thickness, and FIGS. 9a–c show a structure in which a corner (20) is thicker than that of a side (21). In FIG. 9b, the outside is thicker; and in FIG. 9c, the inside is thicker. The shaping was performed by suitably masking the channel box, followed by chemical etching by mixed acid solution of hydrogen fluoride and nitric acid or machining.

Moreover, in the same manufacturing process, a hexagonal channel box may be obtained. In this hexagonal channel box the wall thickness may be made constant or corner portions may be made thicker.

EXAMPLE 4

An alloy powder No. 3 of Table 1 in Example 1, was mechanically alloyed in the same manner as in Example 1, and was subjected to HIP, hot-working and cold-working, like the sheath tube, into a shape of a spacer. The inside diameter of the tubular spacer was larger than the outside of the sheath robe, and the inside diameter portion of the tubular spacer was not provided the pure Zr liner. It was subjected to hot-extrusion in the state where the pure Zr inner robe was not inserted.

FIG. 10a shows a plan view and FIG. 10b shows a side view of a spacer (13) of 8×8 type. The spacer (13) is intended to regularly arrange fuel rods as an assembly. The spacers (13) in the number of seven pieces or more are disposed in the assembly, and control rods (16) are disposed between the assemblies so as to crossed to each other as shown in the figures.

As shown in FIG. 11, the spacer (13) includes 8–10 pieces of cylindrical circular cells (14) for one row, for example, in the arrangement of 8×8, 9×9, and 10×10 (pieces). The cell (14) may be formed of the same material as in this example. It can be manufactured in the same process as that of the sheath tube in Example 1 except that the pure Zr was not provided in the hollow billet.

In this example, since the spacer (13) and the cell (14) are formed of a high strength material having the above-described composition, either of the spacer (13) and the cell (14) can be thinned to a wall thickness of 0.35 to 0.6 mm. This reduces the average interval between fuels, thus achieving a high conversion reactor.

Figure 12:
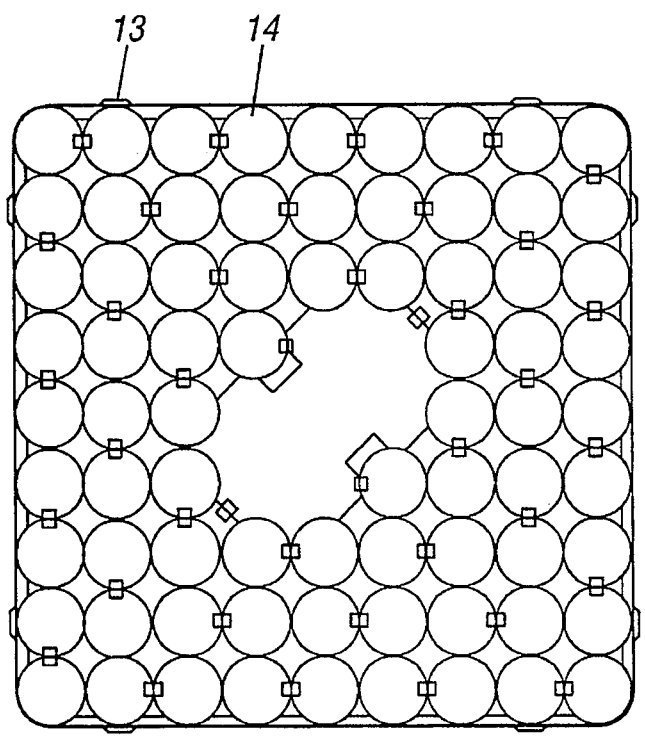
FIG. 12 is a plan view of a spacer.

FIG. 12 is a plan view of a spacer (13) of 9×9 type and cells (14) disposed therein.

The average interval between the sheath tubes of 8×8 type shown in FIGS. 10a–b can be set at about 3.0 to 4.5 mm; and the average interval for the sheath tube of 9×9 type shown in FIG. 12 can be set at 1.0 to 2.5 mm. By strengthening the sheath tube, spacer (13) and cell (14) using an alloy containing alloy elements in increased amounts, the integration of the sheath tube of 9×9 type or 10×10 type can be further increased, and the average interval can be further reduced to be 1 to 2.0 mm. The circular cells (14) are welded to each other or fixed on the outer frame of the spacer (13), and spring made holding members are mounted to form a slight space between the sheath tubes. The spring made holding member can be also formed of a sheet of the Zr alloy or Ni alloy of the present invention.

EXAMPLE 5

Figure 13:
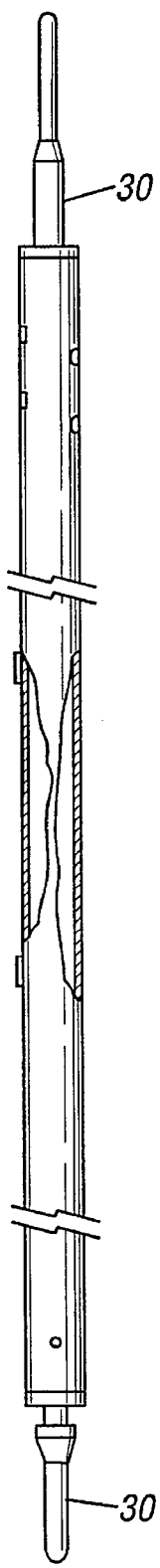
FIG. 13 is a partial sectional view of a water rod.
Figure 14:
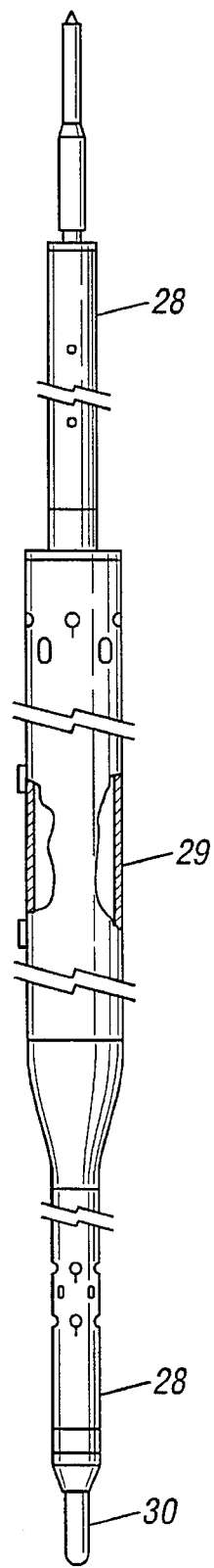
FIG. 14 is a partial sectional view of a water rod.

FIGS. 13 and 14 are partially sectional plan views each showing a water rod. The water rod in this example was manufactured by forming a hollow billet without a pure Zr liner tube by use of each of the alloy Nos. 1 and 2 shown in Table 1 of Example 1 in the same manner as in Example 1; and repeatedly applying, to the hollow billet, the cold-working by the pilger mill and annealing in the same manner as in Example 1. A small diameter portion (28) and a large diameter portion (29) shown in FIG. 14, were separately manufactured, and they were integrated with each other by welding. Reference numeral (30) designates an end plug.

EXAMPLE 6

Figure 15:
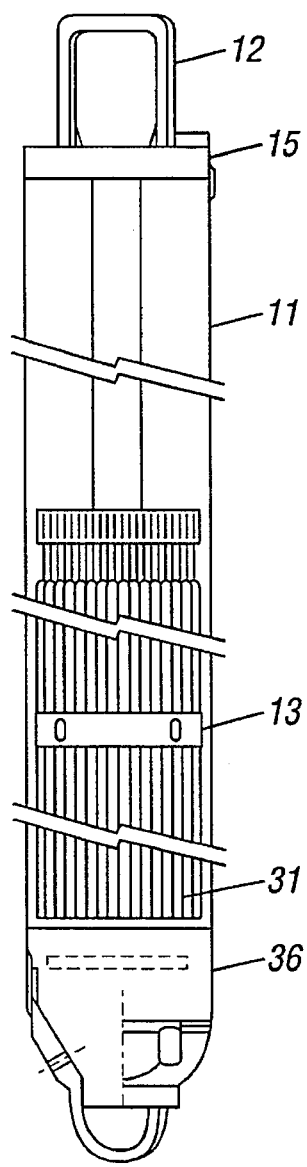
FIG. 15 is a plan view of a fuel assembly for a high conversion reactor.

FIG. 15 is a sectional view of a fuel assembly for a boiling water type high conversion nuclear reactor according to the present invention. As shown in the figure, the fuel assembly includes a large number of fuel rods (31); seven steps or more of spacers (13) for holding the fuel rods (31) at specified intervals; an angular cylindrical channel box (11) for containing the fuel rods (31) held by the spacers (13); an upper end tie plate (15) and a lower end tie plate (36) for holding both the ends of the fuel rods (31) containing fuel pellets in the fuel sheath tubes (1); and a hanging handle (12) for carrying the whole assembly.

The fuel channel box (11) contains the fuel rods (31) integrated with each other by the fuel spacers (13). The fuel channel box (11) is obtained by joining two-divided U-shaped plates manufactured in Example 2 by plasma welding into an angular cylindrical shape. The member acts to regularly run both steam generated on the surfaces of fuel rods (31) and high temperature water flowing between the fuel rods (31), and to forcibly introduce them upward. Since the channel box (11) has the internal pressure being slightly higher than the external pressure, it can be used for a long period in the state that a stress is applied so as to expand the angular cylinder outward.

Figure 16:
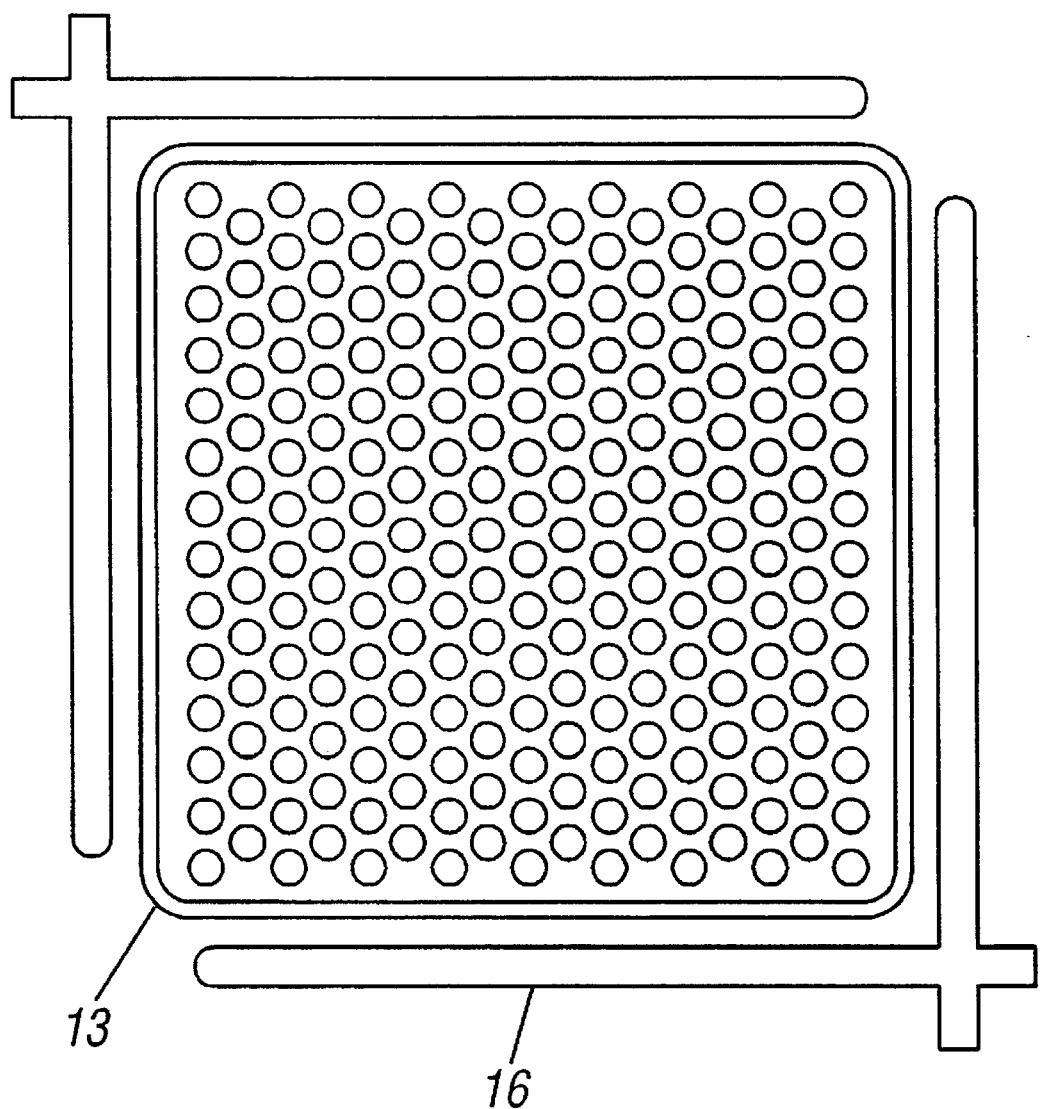
FIG. 16 is a plan view showing a control rod and a fuel assembly in a high conversion reactor.

The channel box (11) in this example shows the arrangement in which 247 pieces of fuel rods (31) are disposed held by the spacers (13) as shown in FIG. 16. The circular cell (14) in the spacer (13) is the same as that in Example 4.

As a high conversion type BWR fuel, there is used an MOX fuel in which plutonium is added to enrich depleted uranium or natural uranium. In the BWR, for enhancing the conversion ratio and increasing the produced amount of plutonium, it is required to lower the water-fuel ratio. This can be achieved by disposing fuel rods in a fuel assembly in a closed-pack manner for lowering the amount of a moderator to the fuel. In the case of realizing the same conversion ratio, the water density can be simply reduced by steam voids in the reactor core, so that the interval between fuel rods can be made large as compared with a pressurized water reactor. This is advantageous not only in cooling fuel but also in manufacturing the assembly.

In consideration of application to a conventional type reactor core, the reactor core uses a fuel assembly having a square section and a cross-shaped control rod for minimizing the modification of the nuclear reactor structure. As the arrangement of fuel rods there is adopted a closed-pack triangular arrangement shown in FIG. 16 for lowering the water-fuel ratio. Moreover, the enlargement of the fuel assembly reduces the area of the water gap portion between fuel assemblies. Thus, it becomes possible to increase the number of fuel rods per unit area by about two times that of a conventional type BWR. Accordingly, in the case of the same reactor core equivalent diameter, by reducing the effective length of the fuel rod to be about half, the thermal output of the fuel rod per unit length can be made to be similar to that of a conventional reactor core. In this case, the pressure loss in the reactor core can be reduced by the shortening of the effective length of the fuel rod.

Figure 18:
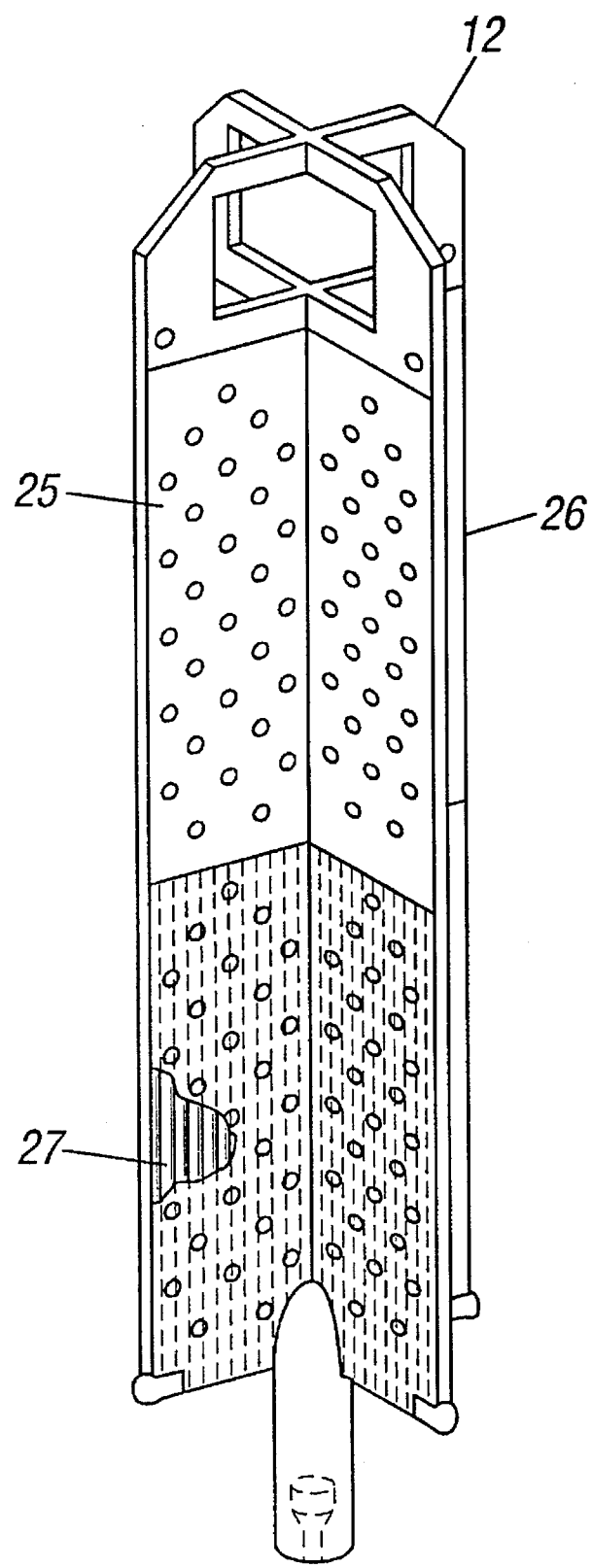
FIG. 18 is a perspective view of a control rod for a high conversion reactor.

The water-fuel ratio can be further reduced by adoption of a control rod with a follower (25) in which a zirconium made follower (25), shown in FIG. 18, is provided at the leading edge of an absorption material of the control rod, in addition of the arrangement of the fuel rods. Namely, when the reactor core is stopped, the absorption material portion of the control rod with a follower (25) is inserted in the reactor core; but in the operation, only the follower (25) portion is inserted for excluding water from the water gap portion, thereby reducing the water-fuel ratio, resulting in the increased conversion ratio. Moreover, the water-fuel ratio is increased by fully drawing the follower (25) portion of the control rod at the end of the cycle, as needed, thereby obtaining the gain of the reactivity.

In this example, 247 pieces of the fuel rods are arranged in one channel box.

FIG. 17 is a sectional view showing the structure of a high conversion reactor.

The pressure vessel used in the nuclear reactor is not required to be changed in design from that used in a conventional type BWR; but the fuel assembly (10) loaded in the pressure vessel and a control rod guide tube, reactor core supporting plate (19) and an upper grating plate (18) in association with the enlarged control rod must be changed. As for the other parts such as an internal pump system and a steam separator (17), the existing structures may be used. The high conversion reactor shortens the fuel effective length. However, the control rod is provided with a follower and has the same length as conventional. Accordingly, the fuel channel box is set at the conventional length used for the supporting and guiding the control rod. Thus, the channel box can be supported by the upper end grating plate as in a conventional type BWR, and is not required to be changed in design.

What is claimed is:

1. A fuel assembly for a nuclear reactor comprising fuel assembly elements, said fuel assembly elements comprising:

a fuel sheath tube;

a spacer tier holding said fuel sheath tube; and a channel box for containing a plurality of said sheath tubes, wherein at least one fuel assembly element comprises a Zr-containing matrix alloy, wherein an average crystal grain size of said matrix alloy is in the range of 1000 nm or less.

2. A fuel assembly as in claim 1 wherein said average crystal grain size is in the range of 100 nm or less.

3. A fuel assembly as in claim 1 wherein at least one of said fuel assembly elements comprises a Zr alloy having a random crystal orientation.

4. A fuel assembly as in claim 1 wherein at least one fuel assembly element comprises a Zr alloy having greater than about 0.02 wt % of Fe.

5. A fuel assembly as in claim 4 wherein at least one fuel assembly element comprises a Zr alloy having at least about 0.05 to 30 wt % of Fe, and an average crystal grain size of said Zr alloy is in the range of 100 nm or less.

6. A fuel assembly as in claim 1 wherein at least one fuel assembly element comprises a $ZrFe_2$ intermetallic compound containing at least about 33 atomic percent Zr.

7. A fuel assembly as in claim 1 wherein at least one fuel assembly element comprises a $ZrFe_2$ intermetallic compound containing at least about 66 atomic percent Fe.

8. A fuel assembly as in claim 7 wherein at least one fuel assembly element comprises a $ZrFe_2$ intermetallic compound containing at least about 33 atomic percent Zr.

9. A fuel assembly as in claim 1 wherein at least one fuel assembly element comprises a $Zr(Fe, Ni, Cr, Sn)_2$ intermetallic compound containing a range of Zr between about 30 and about 35 atomic percent.

10. A fuel assembly as in claim 1 wherein at least one fuel assembly element comprises a $Zr(Fe, Ni, Cr, Sn)_2$ intermetallic compound containing a range of (Fe, Ni, Cr, Sn) of between about 65 and about 70 atomic percent.

11. A fuel assembly as in claim 10 wherein at least one fuel assembly element comprises a $Zr(Fe, Ni, Cr, Sn)_2$ intermetallic compound containing a range of Zr between about 30 and about 35 atomic percent.

12. A fuel assembly element for a nuclear reactor comprising a Zr-containing matrix alloy comprising an average crystal grain size of 1000 nm or less.

13. A fuel assembly element as in claim 12 wherein said average crystal grain size is less than about 100 nm.

14. A fuel assembly element as in claim 12 wherein said Zr-containing metal comprises a Zr alloy having at least about 0.02 wt % of Fe.

15. A fuel assembly element as in claim 14 wherein said Zr-containing metal comprises a Zr alloy having at least about 0.05 to 30 wt % of Fe and an average crystal grain size of said Zr alloy is in the range of 100 nm or less.

16. A fuel assembly element as in claim 12 said Zr-containing metal comprises a $ZrFe_2$ intermetallic compound containing at least about 33 atomic percent Zr.

17. A fuel assembly element as in claim 12 wherein said Zr-containing metal comprises a $ZrFe_2$ intermetallic compound containing at least about 66 atomic percent Fe.

18. A fuel assembly element as in claim 17 wherein said Zr-containing metal comprises a $ZrFe_2$ intermetallic compound containing at least about 33 atomic percent Zr.

19. A fuel assembly element as in claim 12 wherein said Zr-containing metal comprises a $Zr(Fe, Ni, Cr, Sn)_2$ intermetallic compound containing a range of Zr between about 30 and about 35 atomic percent.

20. A fuel assembly element as in claim 12 wherein said Zr-containing metal comprises a $Zr(Fe, Ni, Cr, Sn)_2$ intermetallic compound containing a range of (Fe, Ni, Cr, Sn) of between about 65 and about 70 atomic percent.

21. A fuel assembly element as in claim 20 wherein said Zr-containing metal comprises a $Zr(Fe, Ni, Cr, Sn)_2$ intermetallic compound containing a range of Zr between about 30 and about 35 atomic percent.

22. A fuel assembly element manufacturing method comprising:

a) mechanically mixing a Zr-containing metal and an alloying element, the alloying element being chosen from a group consisting of: Fe, Cr, Ni, Nb, Mo, Te, Bi, and Sn, whereby a Zr alloy is produced;

b) subjecting the Zr alloy to an isostatic pressure, whereby a pressure-treated Zr alloy is produced;

c) crystallizing the pressure-treated Zr alloy in a temperature range of between a crystallization temperature of the pressure-treated Zr alloy and a maximum crystallization temperature, said maximum crystallization temperature being 200 degrees C. above the crystallization temperature of the pressure-treated Zr alloy, whereby a Zr matrix alloy is produced;

d) forming the Zr matrix alloy into a shape of the fuel assembly element.

23. A method as in claim 22 wherein said crystallizing occurs during said subjecting, wherein said subjecting comprises subjecting the Zr alloy to an isostatic pressure at a temperature lower than the crystallization temperature of the Zr alloy.

24. A method as in claim 22 wherein said crystallizing comprises working the pressure-treated Zr alloy at a temperature range between about 100 degrees C. and about 200 degrees C.

25. A method as in claim 24 wherein said subjecting occurs at a temperature above the crystallizing temperature for said Zr alloy.

26. A method as in claim 22 wherein said mechanically mixing comprises:

hydrogenation of the Zr-containing metal;

crushing of the Zr-containing metal into a powder, and;

dehydrogenation of the powder.

27. A method as in claim 26 wherein said dehydrogenation comprises heating in a vacuum atmosphere.

28. A method as in claim 22 wherein said Zr-containing metal comprises a powder of pure Zr.

29. A method as in claim 22 wherein said Zr-containing metal comprises a powder of a Zr alloy.

30. A method as in claim 22 wherein the temperature is never allowed above about 650 degrees C.

31. A method as in claim 22 further comprising hot-working, performed below about 650 degrees C.

32. A method as in claim 22 further comprising annealing, performed at a temperature higher than about 530 degrees C.

* * * * *